United States Patent
Belknap

(10) Patent No.: US 6,779,909 B2
(45) Date of Patent: Aug. 24, 2004

(54) CAPACITOR MOUNTING APPARATUS

(75) Inventor: Lee J. Belknap, Hendersonville, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/683,181

(22) Filed: Nov. 29, 2001

(65) Prior Publication Data

US 2003/0099106 A1 May 29, 2003

(51) Int. Cl.⁷ .................................................. F21V 23/06
(52) U.S. Cl. ....................................... 362/265; 362/263
(58) Field of Search ............................. 362/265, 263, 362/221

(56) References Cited

U.S. PATENT DOCUMENTS

| | | | |
|---|---|---|---|
| 3,870,392 A | 3/1975 | Bond | 339/14 R |
| 4,323,215 A | 4/1982 | Berger | 248/544 |
| 4,791,539 A | 12/1988 | Ewing | 362/221 |
| 5,351,174 A * | 9/1994 | Ewing | 362/226 |
| 5,784,254 A | 7/1998 | Stephan et al. | 361/690 |

* cited by examiner

Primary Examiner—Alan Cariaso
Assistant Examiner—Guiyoung Lee
(74) Attorney, Agent, or Firm—Fay, Sharpe, Fagan, Minnich & McKee, LLP

(57) ABSTRACT

A lighting fixture includes a socket that operatively receives a light bulb, lamp, or light source. A means for receiving electrical power is provided. A cylindrical capacitor is at least partially secured to the lighting fixture by at least one wire tie via a plurality of holes arranged in a mounting surface of the lighting fixture. Preferably, the cylindrical capacitor includes a rim. The mounting surface includes a retaining tab arranged thereon and a slot formed therein. The retaining tab cooperates with the slot to partially secure at least a portion of the capacitor rim. The secured rim portion further cooperates with the at least one wire tie to operatively secure the capacitor to the mounting surface of the lighting fixture.

15 Claims, 9 Drawing Sheets

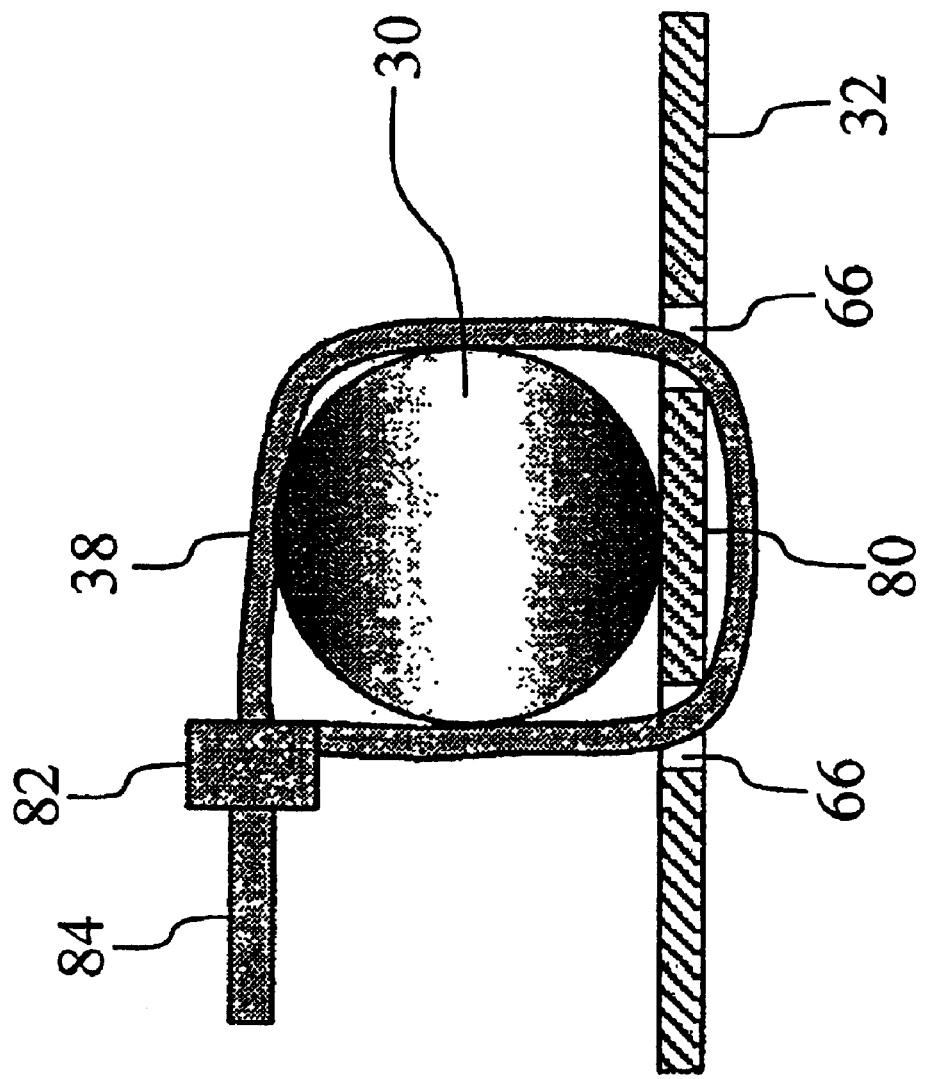

CAPACITOR MOUNTING APPARATUS

BACKGROUND OF INVENTION

The invention relates to the lighting arts. It is especially applicable to lighting fixtures used in home, business, educational, and other settings. However, the invention will find application in other situations where a capacitor or any similar component having a cylindrical housing with a crimped or otherwise formed lip disposed at an end thereof is to be mounted in rigid fashion on a flat surface.

Lighting fixtures often include capacitors for forming ballasts or other electrical conditioning circuitry. The mounting of these capacitors in a rigid fashion within the limited spatial constraints of a light fixture presents a significant engineering challenge. Capacitors for light fixtures are often commercially sold in can-type housings which typically do not include integral mounting brackets or other mounting means. Usually, such capacitors are mounted in the lighting fixture using relatively expensive brackets or the like. These brackets brace the capacitor can and are fastened in place using screws or bolts. Other capacitor mountings known in the art include snap clips, spring clips, or other pressure clamps that hold the capacitor into a shaped cavity, and plates with holes into which the capacitor is inserted that are biased at an angle to create a clamping force.

An additional difficulty in mounting capacitors into lighting fixtures is that the dimensional tolerances of the capacitors can be high, which complicates design of standardized mounting brackets. In one instance the dimensional tolerances of the capacitors may be as high or higher than 0.25 inch. Furthermore, the dimensions of lighting fixture capacitors are not well standardized and can vary dimensionally depending upon the capacitor manufacturer, even in the case of capacitors having the same electrical properties.

The present invention contemplates an improved capacitor mounting apparatus for use in lighting fixtures and other settings, that overcomes the above-mentioned limitations and others.

SUMMARY OF INVENTION

In accordance with one aspect of the present invention, a mounting apparatus for mounting an associated can-type capacitor to a sheet metal portion of an associated electrical device housing is disclosed. A clip is arranged on the sheet metal portion. A receiving region is arranged on the sheet metal portion. The receiving region receives an edge of the capacitor and cooperates with the clip to at least partially secure the capacitor to the sheet metal portion.

In accordance with another aspect of the present invention, a mounting apparatus for mounting an associated capacitor within the housing of an associated electrical apparatus is disclosed. At least one wire tie at least partially encircles the capacitor and cooperates with at least one hole formed into the housing to secure the capacitor to the housing.

In accordance with yet another aspect of the present invention, a lighting fixture is disclosed. A socket is provided for operatively receiving a light bulb, lamp, or light source. A means for receiving electrical power is provided. A cylindrical capacitor is at least partially secured to the lighting fixture by at least one wire tie via a plurality of holes arranged in a mounting surface of the lighting fixture.

Still further advantages and benefits of the present invention will become apparent to those of ordinary skill in the art upon reading and understanding the following detailed description.

BRIEF DESCRIPTION OF DRAWINGS

The invention may take form in various components and arrangements of components, and in various steps and arrangements of steps. The drawings are only for purposes of illustrating a preferred embodiment and are not to be construed as limiting the invention.

FIG. 9 shows a preferred embodiment of a wire tie that secures a capacitor in a lighting fixture.

DETAILED DESCRIPTION

Figure 1:
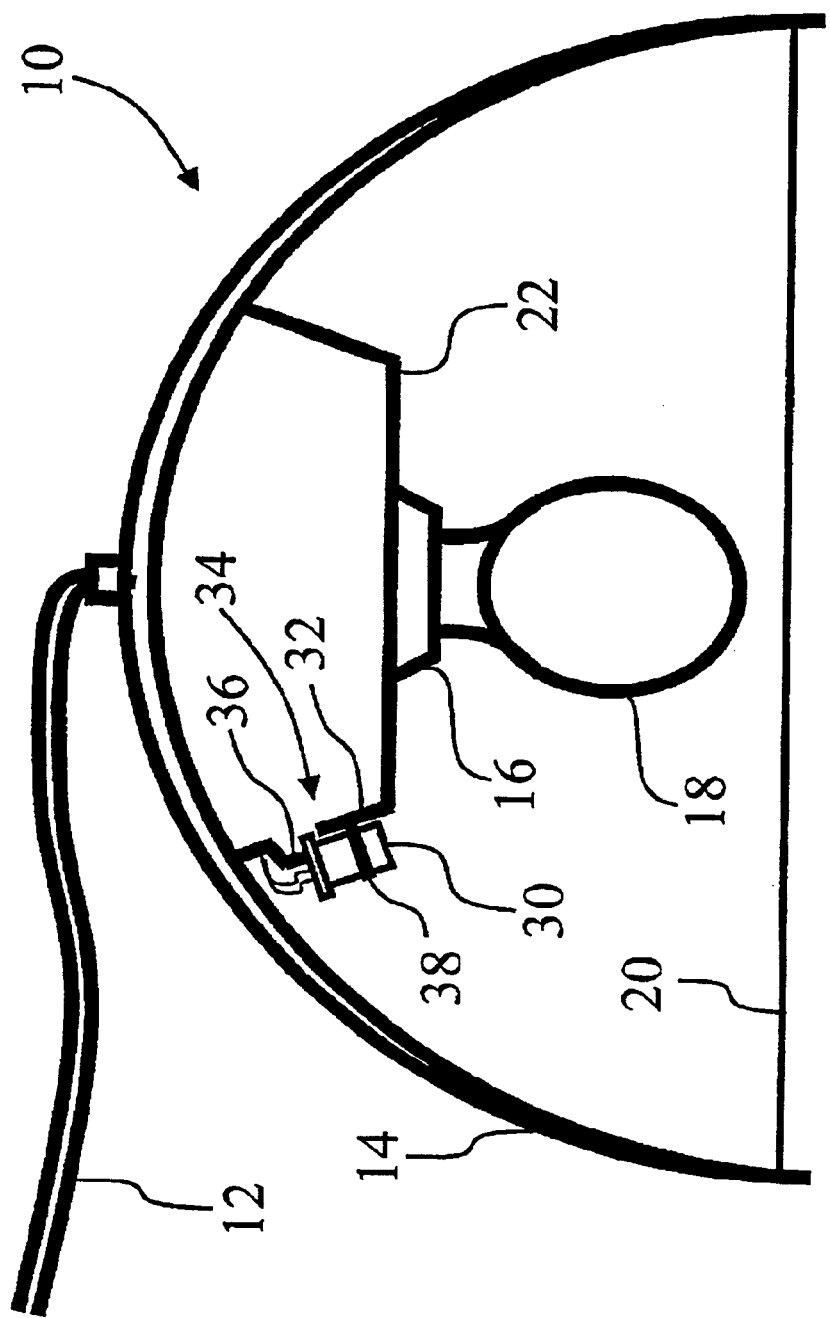
FIG. 1 shows a lighting fixture having a capacitor mounted in accordance with a preferred embodiment of the invention.

With reference to FIG. 1, a lighting fixture 10 includes a means 12 for receiving electrical power, a reflector 14, and a socket 16 for operatively connecting to an associated light source 18. The illustrated light source 18 may be one of various types including but not limited to lighting fixtures, such as fixtures that employ fluorescent tubes, high intensity discharge (HID) lamps, or the like. The means 12 for receiving electrical power includes a power cord operatively connected to the lighting fixture 10 at one end and having a connection such as but not limited to a two-prong or three-prong plug disposed on the distal end. The connection will be compatible to a power source including but not limited to 110/220 volt, or other voltage level, electrical service outlets. Of course, other electrical receiving means can also be employed, such as a connector adapted to connect to a higher voltage a.c. source, a connector adapted to connect to an automobile cigarette lighter power outlet, a compartment adapted to operatively receive an electrical battery, or the like.

Typically, the lighting fixture 10 includes additional components. For example, an optional transparent cover 20 protects the light bulb 18 from outside contact. Additionally, conditioning electronics (not shown) can be included inside or outside a housing 22, which housing 22 preferably also provides overall mechanical support for the lighting fixture 10. The conditioning electronics preferably regulate current and/or voltage, provide initial lamp ignition energy, or the like. In many cases, the conditioning electronics advantageously include one or more capacitors 30 which, for example, can provide a high voltage discharge for initiating current in a fluorescent tube, among many other lighting applications thereof. The capacitor 30 is preferably mounted to a mounting surface 32 of the housing 22 by a mounting apparatus 34. In a preferred embodiment, the mounting apparatus 34 includes a clip 36 and a wire tie 38. In a preferred embodiment, the housing 22 is comprised at least partially of sheet metal, and the mounting surface 32 is a sheet metal portion.

Of course, those of ordinary skill in the art will recognize that many variations of the lighting fixture 10 are possible. For example, in another embodiment, the housing 22 is outside of the reflector 14, e.g. the reflector 14 is mounted below the housing 22 (not shown). In yet another embodiment, the reflector 14 is omitted completely. The illustrated lighting fixture 10 of FIG. 1 is intended to be exemplary and not limiting.

Figure 2:
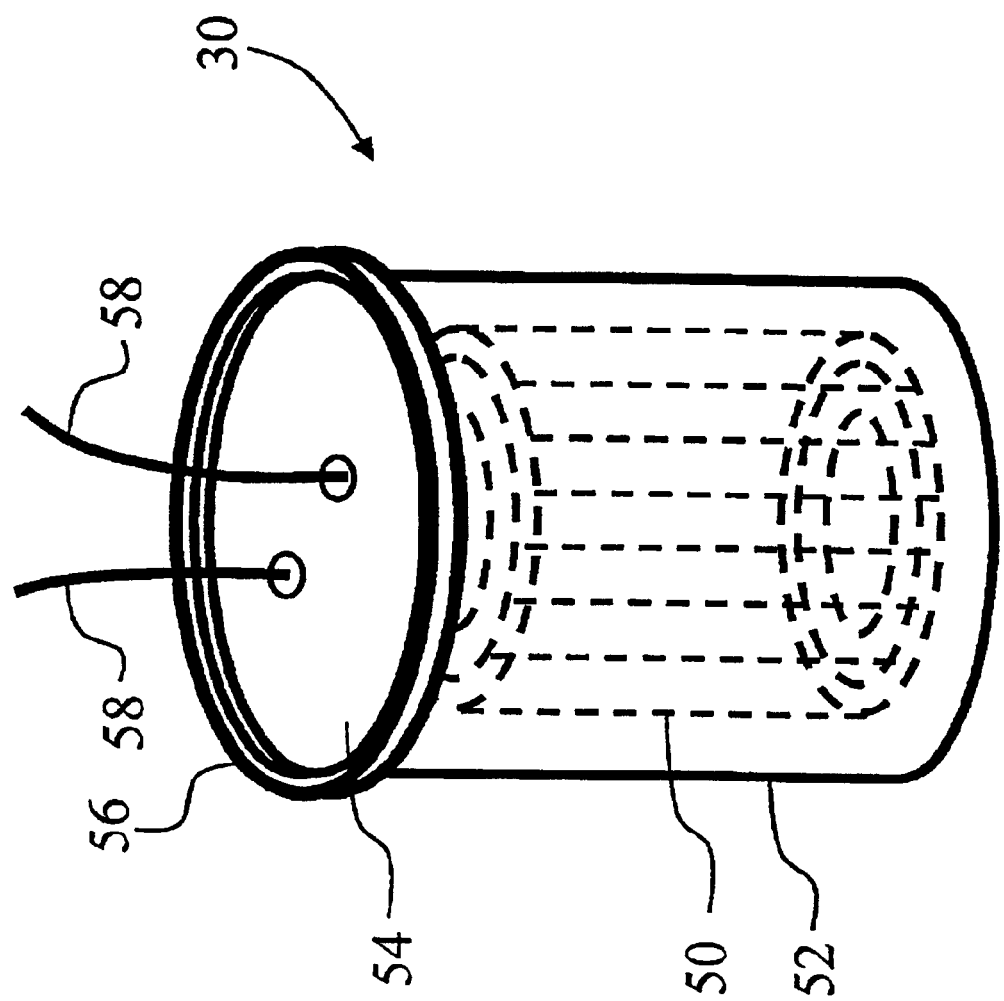
FIG. 2 shows a prior art can-type capacitor.

With reference now to FIG. 2, a capacitor 30 that is typically used for lighting applications is described. The capacitor 30 is of the can-type and includes a capacitive element 50 that is typically a parallel plate-type capacitive element that is arranged in a rolled-up form to fit into a can-type housing 52. The housing 52 is typically an essentially round, oval, or square cylindrical sheet metal can and can be of various sizes and dimensions. A lid 54 seals the can-type housing 52. The connection between the can 52 and the lid 54 is typically formed by crimping, so that a rim 56 is formed therebetween. In a preferred embodiment, the rim 56 extends radially beyond the edge of the can 52. In addition, two electrical leads 58 typically extend from the lid 54. The leads 58 operatively connect to the capacitive element 50 to enable electrical interconnection thereto. Of course, the capacitor 30 shown in FIG. 2 is exemplary and not intended to be limiting. For example, in certain common commercial capacitors the leads 58 are replaced by terminals (not shown), and such capacitors are also compatible with lamp embodiments which suitably practice aspects of the invention.

Figure 3:
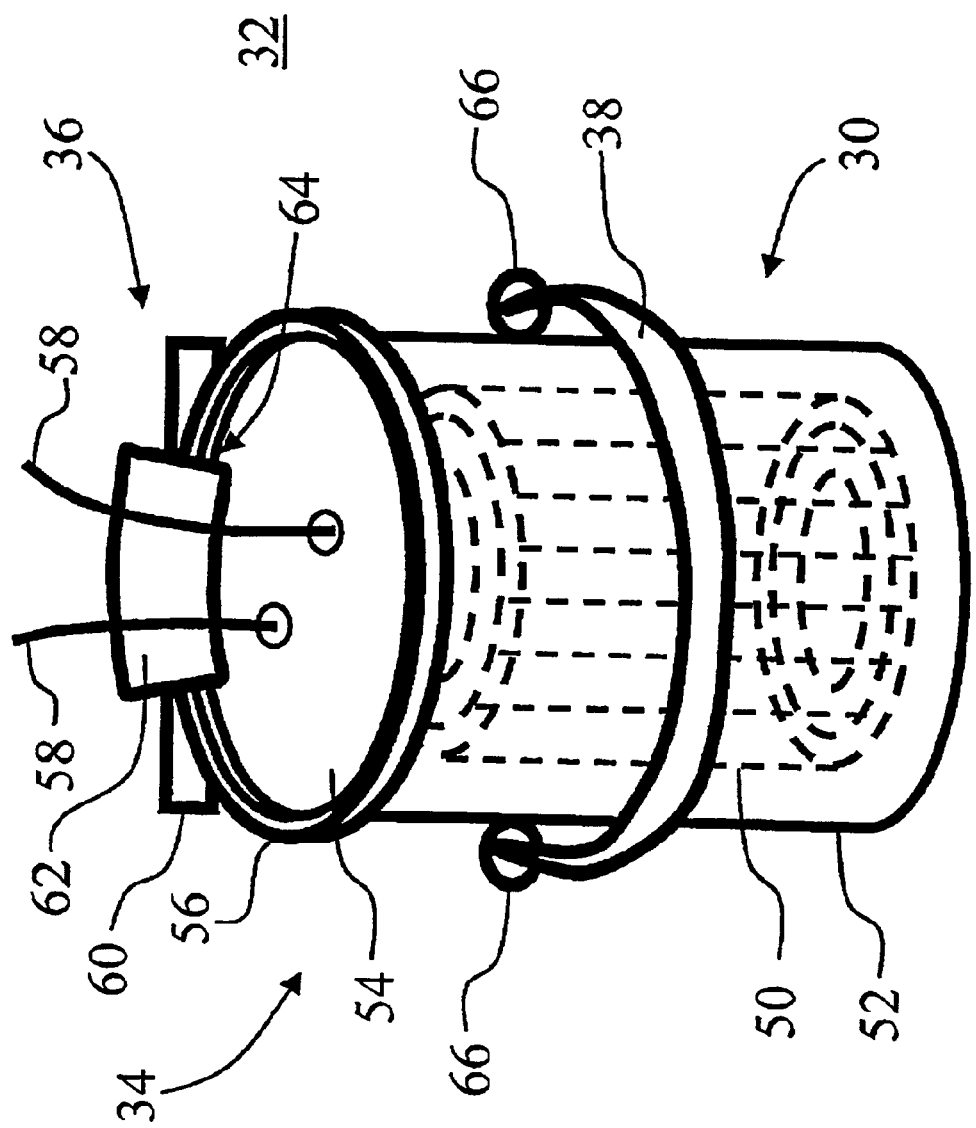
FIG. 3 shows a preferred embodiment of the mounting apparatus.

With continuing reference to FIGS. 1 and 2, and with further reference to FIG. 3, a preferred embodiment for the mounting apparatus 34 that mounts the capacitor 30 to the lighting fixture housing 22 is described. The capacitor 30 is mounted to a mounting surface 32, which is preferably a sheet metal portion. It will be appreciated that although the capacitor 30 is shown mounted to the outside of the housing 22, it could instead be mounted inside the housing 22 in similar fashion, in which case the capacitor 30 is advantageously protected by the housing 22. The mounting apparatus 34 includes the clip 36 which comprises a receiving region 60 that in the preferred embodiment is a slot, and a tab 62. The slot 60 receives a portion 64 of the rim 56 therein. In the secured position, the capacitor 30 is positioned lying against the sheet metal portion 32. In this position, the tab 62 blocks the rim portion 64 within the slot 60. In a preferred embodiment, the receiving region or slot 60 is cut out of the sheet metal portion 32, and the tab 62 is formed from a partially cut-out portion of the sheet metal mounting surface 32. In addition to the clip 36, the mounting apparatus 34 includes a restraining loop which is preferably a wire tie 38. The wire tie 38 binds the capacitor 30 to the mounting surface 32 through two holes 66 in the sheet metal 32.

Figure 4:
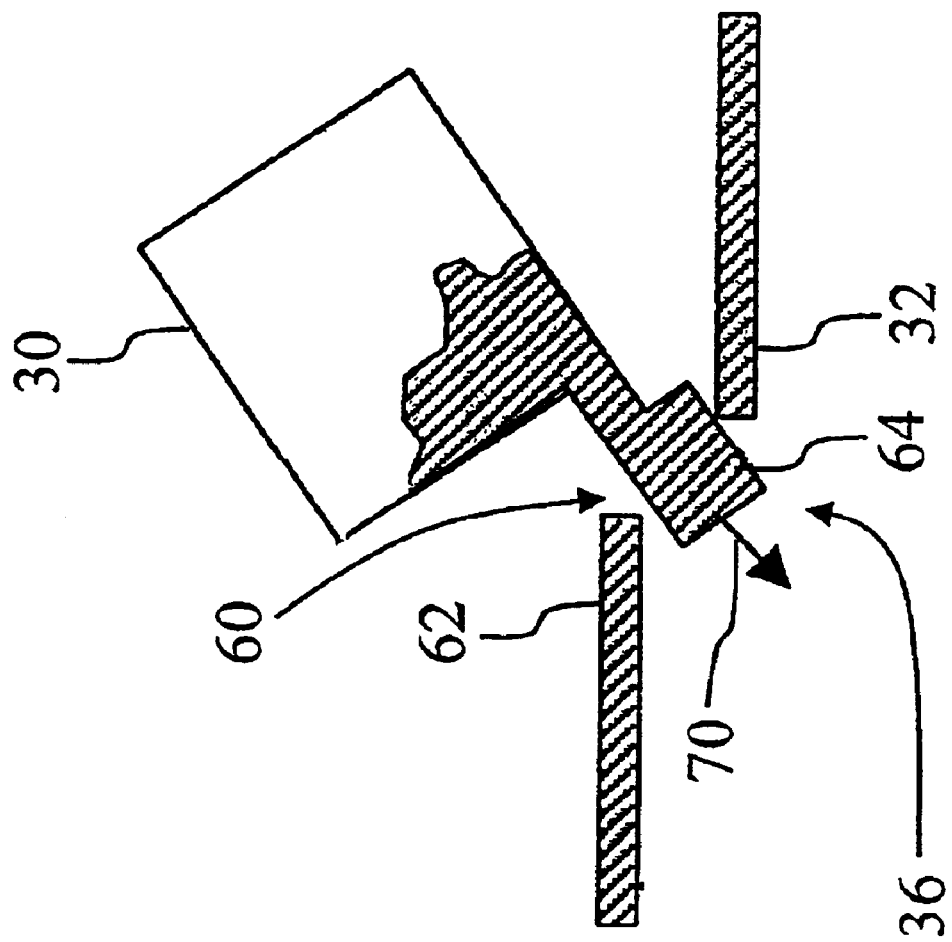
FIG. 4 shows a first step in installing a can-type capacitor into the mounting apparatus of FIG. 3.
Figure 5:
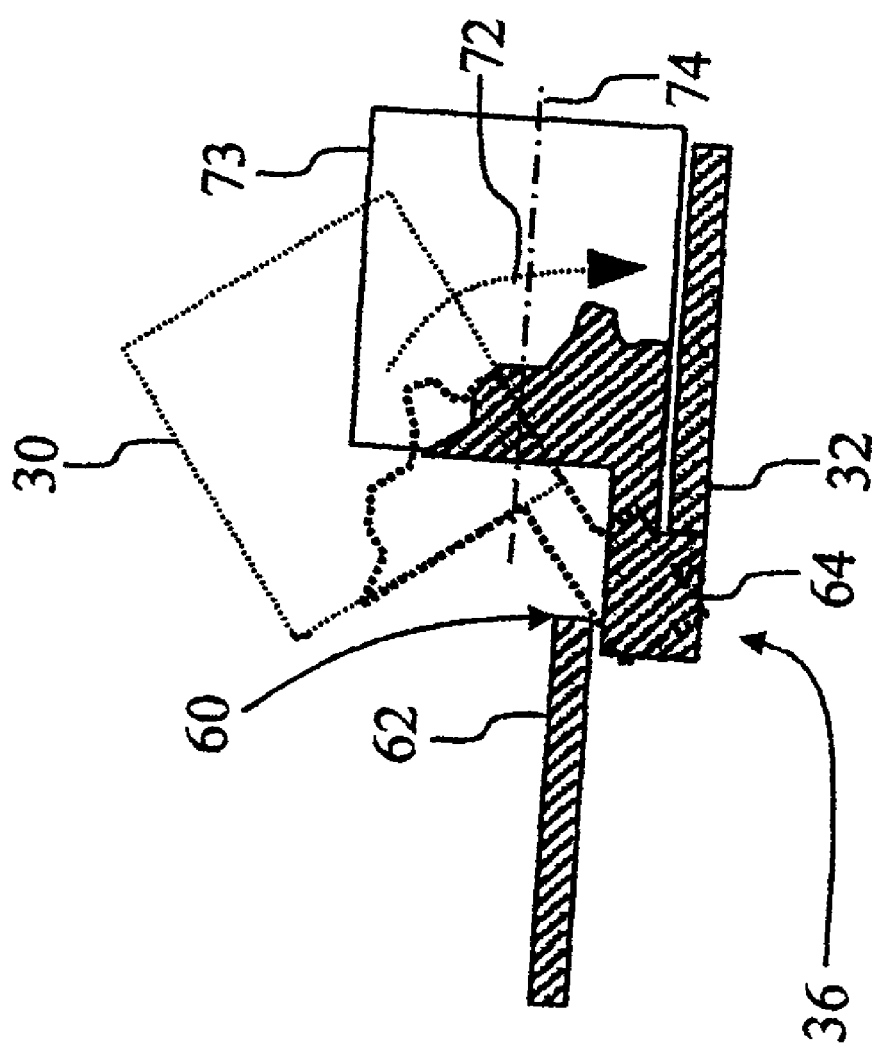
FIG. 5 shows a second step in installing the can-type capacitor into the mounting apparatus of FIG. 3.

With continuing reference to FIGS. 1 through 3, and with further reference to FIGS. 4 and 5, the installation of the capacitor 30 into the mounting apparatus 34 is described. As shown in FIG. 4, in a first step the rim portion 64 is inserted into the slot 60 in an angular direction 70. The angular orientation of the capacitor 30 enables the rim portion 64 to fit into the slot 60 without being hindered by the tab 62. In a second step shown in FIG. 5, the capacitor 30 is rotated 72 about the rim portion 64 until the capacitor lies against the mounting surface 32 in the capacitor position 73 in which the axis 74 of the can of the capacitor 30 is essentially parallel to the mounting surface 32. In this position, the capacitor 30 is secured except against a reversal of the rotational motion 72. In one embodiment a securing loop such as the wire tie 38 completes the securing of the capacitor 30 in the mounting apparatus 34. It is to be appreciated, however, that other devices may be used to provide a restraint to keep the capacitor in place.

Figure 6:
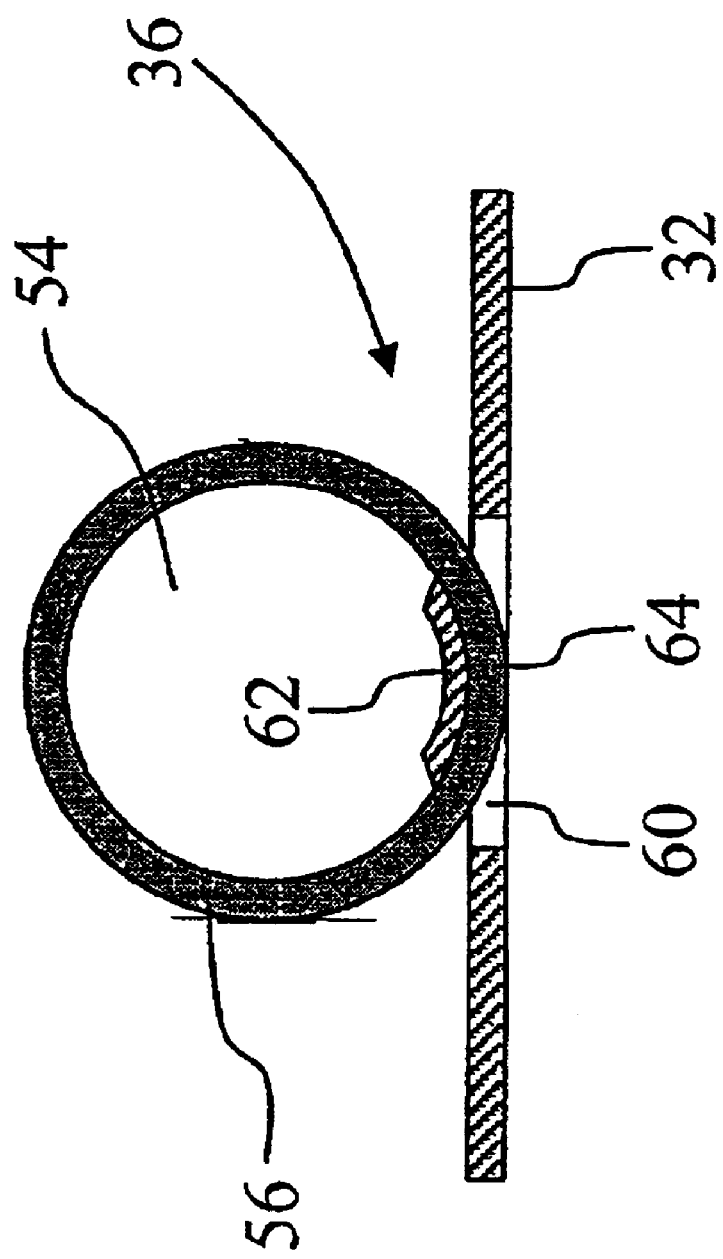
FIG. 6 shows a sectional view of the mounting apparatus of FIG. 3 with a capacitor installed, viewed looking down onto the lid of the capacitor.

With reference to FIG. 6, it will be appreciated that the rim 56 typically runs along the entire circumference of the lid 54. Thus, the rim portion 64 has a curvature that the tab 62 preferably essentially conforms to. The conformational fitting of the tab 62 with the rim portion 64 advantageously provides a more secure retention of the rim portion 64 by the clip 36. It will be appreciated that in the case of a tab 62 formed from a partially cut-out portion of the sheet metal that preferably forms the mounting surface 32, the cut-out portion of the sheet metal is advantageously plastically deformed to shape the conformational tab 62.

Figure 7:
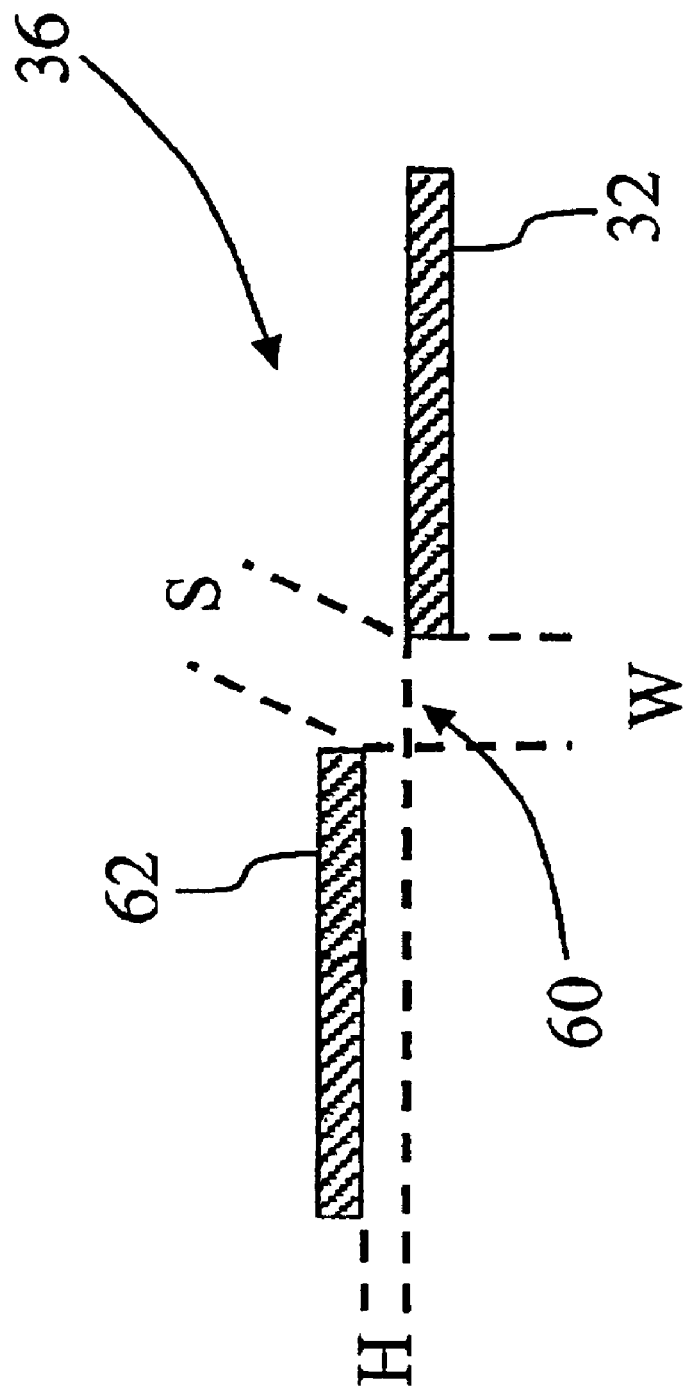
FIG. 7 shows a side sectional view of the clip of the mounting apparatus of FIG. 3.
Figure 8:
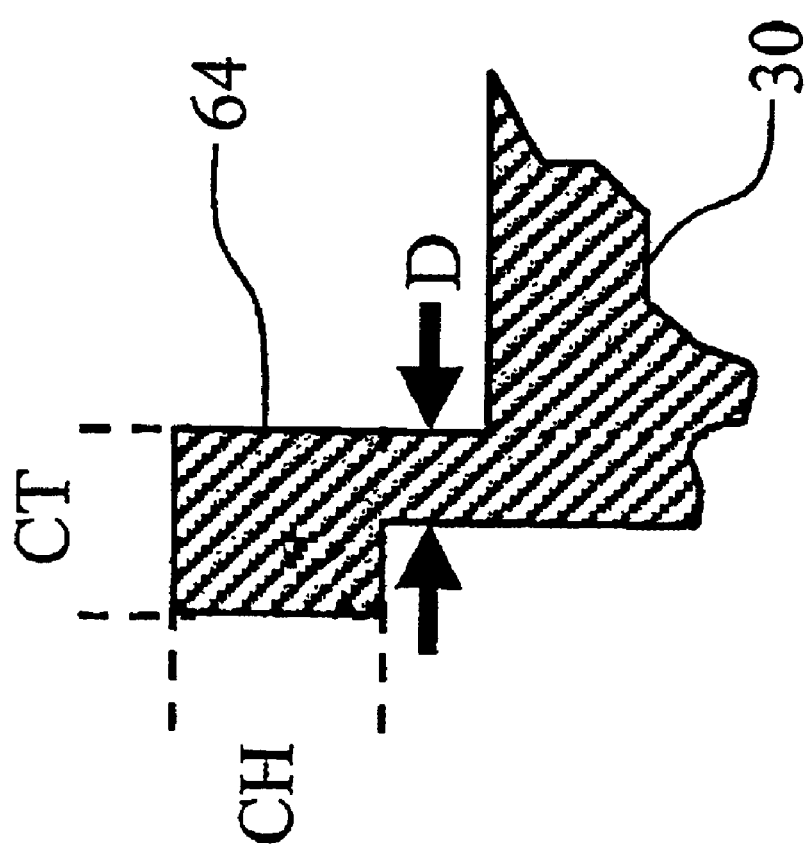
FIG. 8 shows a side sectional view of the capacitor rim portion that inserts into the clip of FIG. 7.

With reference to FIGS. 7 and 8, preferred dimensional constraints on the rim portion 64 and on the clip 36 are described. As shown in FIG. 7, the spatial interrelationship between the slot 60 and the tab 62 that together form the clip 36 is advantageously described in terms of: a slot size S that corresponds to the minimum separation between the bottom slot 60 edge and the tab 62 edge; a slot width W that corresponds to the minimum separation between said edges projected onto the plane of the mounting surface 32; and a slot height H that corresponds to the minimum separation between said edges projected perpendicularly to the mounting surface 32. As shown in FIG. 8, the rim portion 64 is preferably dimensioned as follows: a rim thickness CT corresponds to the thickness of the rim portion 64, i.e. to the thickness of the corresponding crimp; a rim height CH corresponds to the height of the rim or crimp 64; and a thickness D corresponds to the width of the narrower neck of the rim portion 64.

Preferably, the slot width W is less than the crimp height CH to ensure that the rim portion 64 remains locked by the clip 36 when the capacitor 30 is in the secured position 73 (FIG. 5). The slot size S should be greater than the crimp thickness CT to enable the rim portion 64 to be inserted into the clip 36 as shown in FIG. 4. The slot height H should be greater than the narrow rim thickness portion D so that the rim portion 64 fits into the clip 36 when the capacitor 30 is in the secured position 73. The slot height H should be less than the rim thickness CT so that the rim portion 64 remains locked by the clip 36 when the capacitor 30 is in the secured position 30' (FIG. 5).

With reference now to FIG. 9, a preferred embodiment of the wire tie 38 is described. The wire tie 38 preferably encircles the capacitor 30 along with a portion 80 of the mounting surface 32 lying between the holes 66 as shown. The wire tie 38 effectuates securing of the capacitor 30 against the mounting surface 32 and blocks reversal of the rotating 72 step shown in FIG. 5. Preferably, a self-locking wire tie of a type known to those skilled in the art is used. This wire tie has a locking head 82 that has a pawl (not shown) arranged therein that enables the wire tie 30 to be tightened and locked simultaneously simply by pulling on the free end 84 of the wire tie. The self-locking wire tie can be tightened manually or using a tensioning tool. Preferably, the wire tie 38 is manufactured from a heat-resistant material that withstands the elevated temperatures typically encountered in a lighting fixture. It will be appreciated that the wire tie 38 advantageously accommodates capacitors of various sizes and shapes. Lighting fixture capacitors can vary dimensionally, even for capacitors having the same electrical properties. Typically, one or two wire ties, depending upon the housing 22 shape, are sufficient to operatively secure the capacitor 30.

Capacitor mountings of the above-described type provide a rugged, vibration-resistant securing of the capacitor, and units have passed long-term vibration tests with no sign of significant wear.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A mounting apparatus for mounting an associated can-type capacitor to a sheet metal portion of an associated electrical device housing, the mounting apparatus comprising:

a clip arranged on the sheet metal portion; and a receiving region arranged on the sheet metal portion, having a slot formed into the sheet metal portion, the receiving region receiving an edge of the capacitor, the edge comprising a portion of a rim of the capacitor, and cooperating with the clip to at least partially secure the capacitor to the sheet metal portion, wherein the portion of the rim is inserted into the slot when the capacitor is positioned at an angle relative to the sheet metal portion.

2. The mounting apparatus as set forth in claim 1, wherein:

The edge of the capacitor comprises a portion of a rim of the capacitor; and the receiving region includes a slot formed into the sheet metal portion that receives the portion of the rim of the capacitor.

3. The mounting apparatus as set forth in claim 1, wherein:

the rim of the capacitor includes a crimped region formed during crimping of a lid to the can-type capacitor housing.

4. The mounting apparatus as set forth in claim 1, further comprising:

at least one wire tie that passes through at least one hole formed into the sheet metal portion and around the capacitor to retain the capacitor against the sheet metal portion, said at least one wire tie cooperating with said receiving region and said clip to operatively secure the capacitor to the sheet metal portion.

5. A mounting apparatus for mounting an associated capacitor within the housing of an associated electrical apparatus, the mounting apparatus comprising:

a clip that secures to a portion of the capacitor; and at least one wire tie that at least partially encircles the capacitor and that cooperates with at least one hole formed into the housing in securing the capacitor to the housing, wherein the capacitor includes a cylindrical housing having a crimped lip, and the portion of the capacitor includes a portion of the crimped lip.

6. The mounting apparatus as set forth in claim 5, wherein:

the at least one wire tie includes two wire ties, and the at least one hole includes a plurality of holes.

7. The mounting apparatus as set forth in claim 5, wherein:

the clip secures the capacitor against movement parallel to the cylindrical axis.

8. The mounting apparatus as set forth set forth in claim 7, wherein the clip includes:

a tab affixed to the housing; and a slot formed into the housing that receives the portion of the crimped lip.

9. The mounting apparatus as set forth in claim 8, wherein:

the tab is integrally formed into a sheet metal portion of the associated housing.

10. A lighting fixture comprising:

a socket for operatively receiving a light bulb, lamp, or light source;

a cylindrical capacitor that includes a rim extending beyond the main cylindrical body of the capacitor;

at least one wire tie at least partially securing the capacitor to the lighting fixture; and a retaining clip arranged on the mounting surface of the lighting fixture, the lighting fixture having a slot formed therein, said retaining clip cooperating with said slot to partially secure at least a portion of the capacitor rim, said secured rim portion further cooperating with the at least one wire tie to operatively secure the capacitor to the mounting surface of the lighting fixture.

11. The lighting fixture as set forth in claim 10, wherein: the at least one wire tie comprises two wire ties.

12. The lighting fixture as set forth in claim 10, wherein:

the retaining clip includes a retaining clip formed integrally into the mounting surface of the lighting fixture.

13. The lighting fixture as set forth in claim 10, wherein:

the retaining clip includes a partially cut-out portion of the mounting surface of the lighting fixture, said partially cut-out portion being formed into the retaining clip.

14. The lighting fixture as set forth in claim 10, wherein the partial securing of at least a portion of the capacitor rim includes:

inserting the rim portion into the slot, the inserting occurring with the capacitor positioned at an angle relative to the mounting surface; and rotating the capacitor against the mounting surface, said rotating occurring about the inserted rim portion and effectuating a partial securing of the rim between the retaining clip and at least one edge of the slot.

15. The lighting fixture as set forth in claim 10, wherein:

the capacitor rim includes a connecting portion of a capacitor housing, said connecting portion corresponding to a crimped region that connects a lid portion of the capacitor housing to a cylindrical portion of the capacitor housing.

* * * * *